United States Patent [19]

Wilson et al.

[11] Patent Number: 4,790,723

[45] Date of Patent: Dec. 13, 1988

[54] PROCESS FOR SECURING A TURBINE BLADE

[75] Inventors: Ian L. W. Wilson; William G. Clark, Jr., both of Murrysville; Kenneth C. Radford, North Huntingdon, all of Pa.

[73] Assignee: Westinghouse Electric Corp., Pittsburgh, Pa.

[21] Appl. No.: 2,537

[22] Filed: Jan. 12, 1987

[51] Int. Cl.$^4$ .............................................. F01D 5/28
[52] U.S. Cl. ...................... 416/220 R; 416/213 R; 416/241 B
[58] Field of Search ........... 416/241 B, 219 R, 220 R, 416/221, 213 R

[56] References Cited

U.S. PATENT DOCUMENTS

| | | | |
|---|---|---|---|
| 3,317,988 | 5/1967 | Endres | 29/156.8 |
| 3,784,320 | 1/1974 | Rossmann et al. | 416/215 |
| 3,910,719 | 10/1975 | Hessler et al. | 416/134 R |
| 4,051,585 | 10/1977 | Walker et al. | 29/156.8 R |
| 4,169,694 | 10/1979 | Sanday | 416/219 R |
| 4,207,029 | 6/1980 | Ivanko | 416/241 B |
| 4,323,394 | 4/1982 | Hoffmüller et al. | 75/208 R |
| 4,335,998 | 6/1982 | Siebels | 416/213 R |
| 4,417,854 | 11/1983 | Cain et al. | 416/241 B |
| 4,471,008 | 9/1984 | Huther | 427/383.5 |
| 4,573,872 | 3/1986 | Nakata | 416/241 B X |

*Primary Examiner*—Everette A. Powell, Jr.

[57] ABSTRACT

A process provides a method for attaching a turbine blade to a blade support such as a rotor or rotor disc of a turbine. The root portion of the blade is formed to a shape approximately that of a groove in the surface of the rotor or rotor disc and the root portion of the blade is inserted within the groove. A composition comprising a particulate compound selected from the group consisting of a ceramic, graphite metal, metal alloy and mixtures thereof is positioned between the root portion of the blade and steeples, located one on either side of the groove.

20 Claims, 1 Drawing Sheet

PROCESS FOR SECURING A TURBINE BLADE

BACKGROUND OF THE INVENTION

The present invention relates to a process for attaching a blade to a turbine blade support, such as a rotor or rotor disc, of a turbine.

A turbine blade is typically attached to a turbine through a blade root which is disposed within a complementary groove in the rotor or a rotor disc of the turbine rotor. Modern steam turbines and gas tubines often employ a blade attachment design in which the blade roots and rotor or rotor disc grooves are substantially triangularly shaped and include multiple serrations. This design is intended to provide sufficient contact between the blade roots and the steeples, the portions of the rotor or rotor disc between the grooves, so that the maximum operating stresses do not exceed the fatigue strength of the materials from which the blade and blade support are formed. The blade root and groove machining tolerances are critical as even a fraction of a mil mismatch can result in excessive operating stresses at the blade root or the steeple. Because of this concern, very sophisticated machining and inspection techniques are required to manufacture and qualify blades for service applications. Often, many blades must be rejected before one with a properly shaped root is found for a particular groove. This problem becomes even more complex in the reblading of a rotor or rotor disc during a service overhaul since wear on the serrations of the steeple can result in the new blades not fitting properly within the groove.

Thus, it is desired to develop a method for attaching such blades to a blade support that overcomes the aforementioned difficulties.

SUMMARY OF THE INVENTION

The present invention provides a process for attaching a turbine blade to a blade support such as the rotor or a rotor disc of a turbine rotor. The root portion of the blade is formed to a shape approximately that of a groove in the surface of the rotor or rotor disc and the root portion of the blade is inserted within the groove. A composition comprising a particulate compound selected from the group consisting of a ceramic, graphite, metal, metal alloy and mixtures thereof is positioned between the root portion of the blade and steeples, located one on either side of the groove.

The preferred particulate compound is a hydrolysis product of a hydrolysable compound having the general formula:

$$M[R_{v-n}(OR')n],$$

wherein

M is a metal, each R is independently selected from the group consisting of alkyl groups having from 1 to 10, preferably from 1 to 4, carbon atoms, each R' is independently selected from the group consisting of alkyl groups having from 1 to 10, preferably from 1 to 4, carbon atoms, v is an integer equal to the valence of M, and n is an integer of from 2 to v.

The process of the present invention permits optimum contact between the blade roots and the blade support without requiring the fine machining tolerances of currently used methods of blade attachment. The machining tolerances can be relaxed because the particulate material fills any excessive voids between the blade roots and the blade support without weakening the system because the particulate material is capable of withstanding the operating environment of the turbine.

DETAILED DESCRIPTION OF THE PREFERRED EMBODIMENTS

Figure 1:
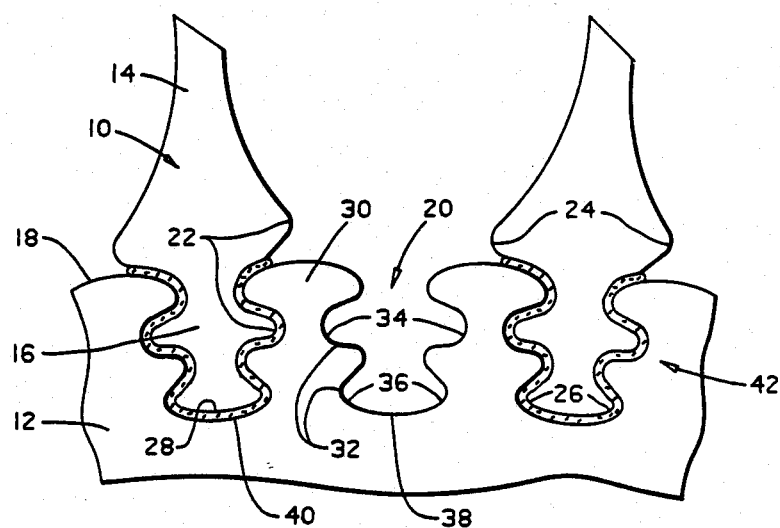
FIG. 1 is a schematic side elevational view of a rotor disc and blade inserted within a groove in the rotor disc according to the present invention.

Each blade 10 to be attached to a blade support, such as a rotor disc 12 of a rotor, includes a blade portion 14, which is the working portion of the blade 10, and a root portion, or blade root, 16 by which the blade 10 is attached to the rotor disc 12. The blade root 16 of the blade 10 can have any one of a number of shapes, but, as illustrated in FIG. 1, preferably has a generally triangular cross-section with one side of the triangle adapted to engage the rotor disc 12 at the surface 18 of the rotor disc 12 and the apex of the triangle opposite that side adapted to extend downwardly within a groove 20 in the surface 18 of the rotor disc 12. Preferably, the cross-section of the blade root 16 is serrated, having a plurality of substantially horizontally extending extensions 22. More preferably, the length of the extensions 22 gradually decreases from long extensions 24 adapted to engage the rotor disc 12 at the surface 18 of the rotor disc 12 toward short extensions 26 at the lower end 28 of the blade root 16 which are adapted to extend downwardly within the groove 20 in the rotor disc 12. Thus, the cross-section of the blade root 16 has an inverted "fir tree" configuration.

The grooves 20 in the surface 18 of the rotor disc 12 are formed between steeples 30. The grooves 20 extend substantially radially from the axis of rotation of the rotor disc 12 in a substantially annular array and are substantially equally spaced from each other in the circumferential direction and from the axis of rotation in the radial direction. The grooves 20 are preferably substantially similar in shape and size to each other and have a configuration which is complementary to that of the blade roots 16. Thus, each groove 20 preferably has a generally triangular cross-section with one side of the triangle at the surface 18 of the rotor disc 12 and the apex of the triangle opposite that side extending downwardly within the groove 20 in the rotor disc 12. Preferably, the cross-section of each groove 20 is serrated, having a plurality of substantially horizontally extending extensions 32. More preferably, the length of the groove extensions 32 gradually decreases from long extensions 34 at the surface of the rotor disc 12 toward short extensions 36 at the lower portion 38 of the groove 20, giving the cross-section of each groove 20 an inverted "fir tree" configuration.

Generally, the grooves 20 accept blades 10 of the side entry type. Thus, the blade roots 16 of the blades 10 are inserted sideways into locking relation with the grooves 20 in an axial direction relative to the rotor. Before the blade root 16 of a blade 10 is inserted within a groove 20, the blade root 16 must be machined so that the dimensions of the blade root 16 are within less than about 0.1 inch (2.5 millimeters) of the dimensions of the groove 20.

Figure 2:
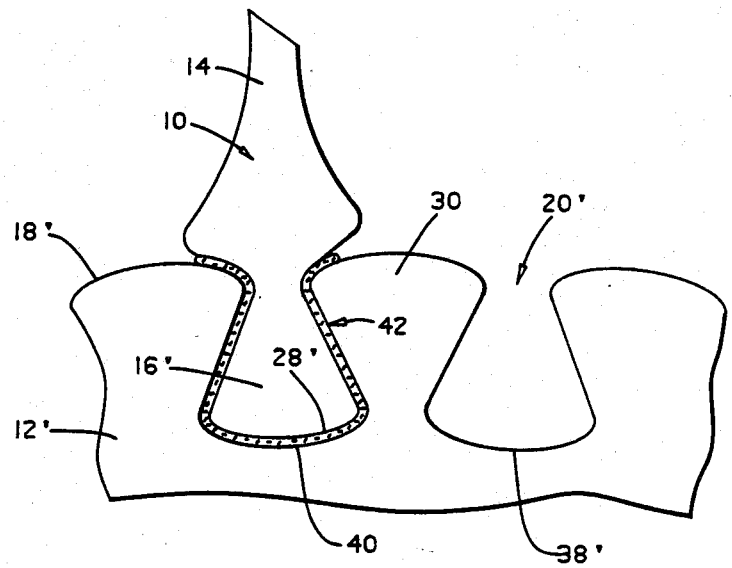
FIG. 2 is a schematic side elevational view of a rotor and blade inserted within a groove in the rotor according to another embodiment of the present invention.

In an alternate embodiment, shown in FIG. 2, the blade support is a rotor 12'. The blade root 16' of the blade 10 is inserted within a groove 20'. The blade root 16' of the blade 10 has a generally triangular crosssection with one apex of the triangle adapted to engage the rotor 12' at the surface 18' of the rotor 12' and the side of the triangle opposite the apex adapted to extend downwardly within the groove 20' in the rotor 12'. Thus, the width of the cross-section of the blade root 16' preferably increases toward the lower end 28' of the blade root 16'. Similarly, the groove 20' has a generally triangular cross-section with one apex of the triangle at the surface 18' of the rotor 12' and the side of the triangle opposite the apex extending downwardly within the groove 20' in the rotor 12'. Thus, the width of the cross-section of the groove 20' preferably increases toward the lower end 38' of the groove 20'.

Although it can be readily understood that the invention is equally applicable to a variety of blade root 16 designs and types of blade supports, the invention will be further described in connection with the embodiment illustrated in FIG. 1. According to the process of the invention, a particulate compound 40 is positioned in the space 42 between the blade root 16 and the steeples 30 to fill any excessively large gaps present due to inadequate machining of the blade root 16. The blade root 16 can be coated with the particulate compound 40 before being inserted within the groove 20, the particulate compound 40 can be placed within the groove 20 prior to inserting the blade root 16 or the particulate compound 40 can be injected into the space 42 between the blade root 16 and the steeple 30 after the blade root 16 has been inserted within the groove 20. The particular compound 40 can be placed within the space 42 between the blade root 16 and the steeple 30 in a dry form. The dry particular compound 40 can include a dry lubricant such as polytetrafluoroethylene or graphite. Generally, in such a process the blade 10 is vibrated during installation to pack the particular compound 40 in the space 42 between the blade root 16 and the steeple 30. Alternatively, the particulate compound 40 can be inserted within the space 42 in a wet form in which the particulate compound 40 is suspended in a carrier liquid, such as water or an alcohol having from 1 to 4 carbon atoms, such as methanol, ethanol, a propanol or a butanol, so that the particulate compound 40 is in the form of a slurry or colloidal suspension. The liquid serves as a lubricant during the installation of the blade root 16. The suspended particulate compound 40 is forced into the space 42 between the steeples 30 and the blade root 16 by gravity and capillary action. The carrier liquid is evaporated after the blade root 16 has been inserted within the groove 20.

The particular compound can be a ceramic, graphite, metals such as stainless steel, steel, nickel, titanium, cobalt and alloys of those metals as well as mixtures of those materials. The term ceramic is used herein to include ceramic materials which are capble of being polymerized, particularly ceramic oxides which can be hydrolyzed to form polymers as well as the resulting polymers themselves. One factor in determining the optimum particulate compound is the particular design of the blade root 16. If the blade root 16 must withstand predominantly compressive stresses, a hard material such as nickel or a ceramic might be appropriate. If the blade root 16 must withstand predominantly shearing stresses, such as in a tapered design, a softer material, such as graphite can be used. In addition, the thermal and chemical environment of the turbine should be considered when choosing a particulate compound. Thus, the particulate compound 40 should have an appropriate coefficient of thermal expansion and should protect the blade root 16 from corrosion.

The average particle size and the particle size distribution of the particulate compound 40 is a function of the size of the space 42 between the blade root 16 and the steeple 30 to be filled and the amount of contact desired between the particulate compound 40 and the steeple 30 and the blade root 16. The greater the amount of contact between the particulate compound 40 and the steeple 30 and the blade root 16, the more evenly the stresses are distributed along the blade root 16. A small average particle size and a narrow particle size distribution increases the amount of contact between the particulate compound 40 and the blade root 16 and the particulate compound 40 and the steeple 30. Because it is difficult to obtain a fine average particle size, less than about $10^{-6}$ inch (250 Angstroms), and narrow particle size distribution through conventional methods, a preferred particulate compound 40 can be obtained by using sol-gel technology involving the polymerization of various organometallic compounds, such as a ceramic oxide, in a dilute alcohol solution.

Thus, the preferred particulate compound 40 is a hydrolyzable compound having the general formula:

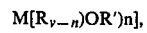

$$M[R_{v-n})OR')n],$$

wherein

M is a metal, each R is independently selected from the group consisting of alkyl groups having from 1 to 10, preferably from 1 to 4, carbon atoms, each R' is independently selected from the group consisting of alkyl groups having from 1 to 10, preferably from 1 to 4, carbon atoms, v is an integer equal to the valence of M, and n is an integer of from 2 to v.

M can be any one of a number of metals that give the resulting particulate compound the necessary thermal, chemical and physical characteristics to withstand the environment of the turbine. The preferred metals include magnesium, aluminum, silicon, calcium, titanium, iron, strontium, yttrium, zirconium and barium. The most preferred metals are aluminum, silicon, titanium, and zirconium.

The hydrolyzable compound is generally positioned within the groove 20 between the blade root 16 and the steeple 30 and then hydrolyzed. The hydrolysis reaction occurs according to the following general sequence:

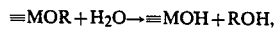

$$\equiv MOR + H_2O \rightarrow \equiv MOH + ROH,$$

and

$$\equiv MOH + \equiv MOR \rightarrow \equiv MOM \equiv + ROH.$$

Preferably, the hydrolyzable compound is present in a solution of an alcohol at a level of up to about 17 percent of silicon dioxide, for example, but normally less than about 7 percent, by weight of the solution. Suitable alcohols used to form the solution include methanol, ethanol, a propanol or a butanol. The extent of the hydrolysis reaction can be determined by controlling the amount of water relative to the hydrolyzable compound to achieve the desired average particle size and particle size distribution of the resulting particulate compound 40. It may be desirable to heat the hydrolysis product to evaporate the alcohol of the composition and the alcohol resulting from the hydrolysis reaction.

Thus, a turbine blade 10 is attached to a blade support in accordance with the present invention so as to provide improved contact between the blade root 16 and the blade support, such as a rotor 12' or a rotor disc 12. The improved contact between the blade root 16 and the blade support allows the blade root 16 and the groove 20 in which the blade root 16 is inserted to better withstand the physical, chemical and thermal stresses of the turbine environment.

What is claimed is:

1. A process for attaching a blade to a blade support of a turbine wherein said blade has a root portion adapted for insertion within a groove in a surface of said blade support, said groove being disposed between two steeples, located one on either side of said groove, said process comprising the steps of:
   forming said root portion of said blade to a shape approximately that of said groove;
   inserting said root portion of said blade within said groove;
   positioning a composition comprising a hydrolyzable compound having the formula:

$M[R_{v-n}(OR')n]$, 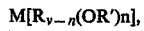

wherein
   M is a metal,
   each R is independently selected form the group consisting of alkyl groups having from 1 to 10 carbon atoms,
   each R' is independently selected from the group consisting of alkyl groups having from 1 to 10 carbon atoms,
   v is an integer equal to the valence of M, and
   n is an integer of from 2 to v, between said root portion of said blade and said steeples; and
   hydrolyzing said compound to attach said blade to said blade support.

2. A turbine comprising:
   a blade support having a surface with at least one groove therein, said groove bgeing disposed between two steeples, located one on either side of said groove,
   a blade having a root portion formed to a shape approximately that of said groove, said root portion of said blade being disposed within said groove; and
   a composition comprising a hydrolyzed compound formed by hydrolyzing a hydrolyzable compound having the formula:

$M[R_{v-n}(OR')n]$, 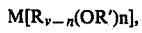

wherein
   M is a metal,
   each R is independently selected from the group consisting of alkyl groups having from 1 to 10 carbon atoms,
   each R' is independently selected from the group consisting of alkyl groups having from 1 to 10 carbon atoms,
   v is an integer equal to the valence of M, ns n is an integer of from 2 to v, disposed between said root portion of said blade and said steeples such that said blade is attached to said blade support.

3. The turbine of claim 2 wherein said groove has a generally triangular cross-section with one side of said triangle at said surface of said blade support and the apex of said triangle opposite said side extending downwardly within said groove in said blade support.

4. The process of claim 2 wherein said groove has a serrated cross-section.

5. The process of claim 4 wherien said crosssection of said groove includes a plurality of substantially horizontally extending extensions, the length of said extensions gradually decreasing from said extensions at said surface of said blade support toward said extensions located downwardly within said groove in said blade support.

6. The process of claim 2 wherien said root portion of said blade has a generally triangular crosssection with one side of said triangle adapted to engage said blade support at said surface of said blade support and the apex of said triangle opposite said side adapted to extend downwardly within said groove in said blade support.

7. The process of claim 2 wherein said root portion of said blade has a serrated cross-section.

8. The process of claim 7 wherein said crosssection of said root portion of said blade includes a pluraliyt of substantially horizontally extending extensions, the length of said extensions gradually decreasing from said extensions which are adapted to engage said surface of said blade support toward said extensions which are adapted to extend downwardly within said groove in said blade support.

9. The process of claim 2 wherein said groove has a generally triangular cross-section with one apex of said triangle at said surface of said blade support and the side of said triangle opposite said apex extending downwardly within said groove in said blade support.

10. The turbine of claim 2 wherein said root portion lower end of said blade has a generally triangular cross-section with one apex of said triangle adapted to engage said blade support at said surface of said blade support and the side of said triangle opposite said apex adapted to extend downwardly within said groove in said blade support.

11. The process of claim 1 further comprising the step of heating said composition after said root portion of said blade is inserted within said groove by exposing said composition to an elevated temperature.

12. The process of claim 1 further comprising the step of polymerizing said particulate compound within said groove after said root portion of said blade is inserted within said groove.

13. The process of claim 1 wherein M is selected from the grup consisting of silicon, titanium, zirconium and aluminum.

14. The process of claim 13 wherein n equals v and R' is an alkyl group having from 1 to 4 carbon atoms.

15. The process of claim 14 wherien said composition further comprises an alcohol.

16. The process of claim 14 wherein said composition comprises up to about 17 percent, by weight, based on the weight of said composition, of said hydrolyzable compound.

17. A process for attaching a blade to a blade support of a turbine wherein said blade has a root portion adapted for insertion within a groove in a surface of said blade support, said root portion of said blade having a generally triangular cross-section, said groove being disposed between two steeples, locates one on either side of said groove and having a generally triangular cross-section, said process comprising the steps of:

forming said root portion of said blade to a shape approximately that of said groove;

inserting said root portion of said blade within said groove;

positioning a composition comprising an alcohol and a hydrolyzable compound having the formula:

$$M[R_{v-n}(OR')n],$$

wherein

M is a metal each R is independently selected form the group consisting of alkyl groups having from 1 to 10 carbon atoms, between said root portion of said blade and said steeples; and polymerizing said hydrolyzable compound within said groove.

18. The process of claim 17 wherein M is selected from the group consisting of silicon, titanium, zirconium and aluminum.

19. The process of claim 18 wherein n equals v and R' is an alkyl group having from 1 to 4 carbon atoms.

20. The process of claim 19 wherein said composition comprises up to about 17 percent, by weight, based on the weight of said composition, of said hydrolyzable compound.

* * * * *